US012586318B2

(12) United States Patent
Jiao

(10) Patent No.: US 12,586,318 B2
(45) Date of Patent: Mar. 24, 2026

(54) METHOD AND APPARATUS FOR LABELING ROAD ELEMENT, DEVICE, AND STORAGE MEDIUM

(71) Applicant: TENCENT TECHNOLOGY (SHENZHEN) COMPANY LIMITED, Shenzhen (CN)

(72) Inventor: Chengjie Jiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 234 days.

(21) Appl. No.: 18/473,378

(22) Filed: Sep. 25, 2023

(65) Prior Publication Data

US 2024/0013489 A1     Jan. 11, 2024

Related U.S. Application Data

(63) Continuation of application No. PCT/CN2023/075663, filed on Feb. 13, 2023.

(30) Foreign Application Priority Data

Mar. 29, 2022     (CN) .......................... 202210315545.6

(51) Int. Cl.
　　*G06T 19/00*　　(2011.01)
　　*G06T 7/12*　　(2017.01)
　　(Continued)

(52) U.S. Cl.
　　CPC ............... *G06T 19/00* (2013.01); *G06T 7/12* (2017.01); *G06T 7/60* (2013.01); *G06T 7/73* (2017.01);
　　(Continued)

(58) Field of Classification Search
　　CPC .. G06T 19/00; G06T 7/12; G06T 7/60; G06T 7/73; G06T 2210/21; G06T 2219/004;
　　(Continued)

(56) References Cited

U.S. PATENT DOCUMENTS 6,622,085 B1 *   9/2003   Amita ................... G06T 11/203
　　　　　　　　　　　　　　　　　　　　　340/995.14
2018/0247528 A1   8/2018   Dey et al.
　　　　　　(Continued)

FOREIGN PATENT DOCUMENTS

CN　　108961990 A　　12/2018
CN　　109163730 A　　1/2019
　　　　(Continued)

OTHER PUBLICATIONS

Citlalli Gamez Serna ; Ruichek, Y. Dynamic Speed Adaptation for Path Tracking Based on Curvature Information and Speed Limits. Sensors 2017, 17, 1383. https://doi.org/10.3390/s17061383 (Year: 2017).*

(Continued)

*Primary Examiner* — Kee M Tung
*Assistant Examiner* — Xiaoming Wei
(74) *Attorney, Agent, or Firm* — Anova Law Group, PLLC

(57) ABSTRACT

A method for labeling a road element includes: obtaining a sequence of road geometry line points of a first road in a three-dimensional map, the sequence of road geometry line points including a plurality of location points for drawing an outline of a road geometry of the first road; segmenting the first road based on the sequence of road geometry line points, to obtain a plurality of road segments of the first road, a road surface of a road segment being drawn as a plane; and determining, in response to that a target road element spans a boundary line of two adjacent road segments in the first (Continued)

```
┌─────────────────────────────────────────────────────────┐
│ Obtain a sequence of road geometry line points of a      │        201
│ first road in a three-dimensional map, the sequence of   │   ⌇
│ road geometry line points including a plurality of       │
│ location points for drawing an outline of a road         │
│ geometry of the first road                               │
└─────────────────────────────────────────────────────────┘
                            ↓
┌─────────────────────────────────────────────────────────┐
│ Segment the first road based on the sequence of road     │        202
│ geometry line points, to obtain a plurality of road      │   ⌇
│ segments of the first road, a road surface of each of    │
│ the road segments being drawn as a plane                 │
└─────────────────────────────────────────────────────────┘
                            ↓
┌─────────────────────────────────────────────────────────┐
│ Determine, in response to that a target road element     │        203
│ spans across a boundary line of two adjacent road        │   ⌇
│ segments in the first road, a joint point located on     │
│ the boundary line, the joint point being configured as   │
│ a label to divide the target road element to two         │
│ sections that are respectively placed on the road        │
│ surfaces of the two adjacent road segments               │
└─────────────────────────────────────────────────────────┘
``` road, a joint point located on the boundary line, the joint point being configured as a label to divide the target road element to two sections that are respectively placed on the road surfaces of the two adjacent road segments.

20 Claims, 8 Drawing Sheets

(51) Int. Cl.
*G06T 7/60* (2017.01)
*G06T 7/73* (2017.01)
(52) U.S. Cl.
CPC .... *G06T 2210/21* (2013.01); *G06T 2219/004* (2013.01)
(58) Field of Classification Search
CPC . G06T 17/05; G06T 7/70; G06T 2207/30204; G01C 21/3819; G01C 21/3867; G01C 21/3673
See application file for complete search history.

(56) References Cited

U.S. PATENT DOCUMENTS

| | | | |
|---|---|---|---|
| 2019/0221047 A1 | 7/2019 | Adlers et al. | |
| 2019/0266772 A1 | 8/2019 | Li | |
| 2020/0182627 A1 | 6/2020 | Morcom et al. | |
| 2020/0256698 A1* | 8/2020 | Shi | G01C 21/3867 |
| 2021/0389149 A1 | 12/2021 | Zeng | |
| 2022/0357179 A1 | 11/2022 | Li et al. | |
| 2024/0013489 A1 | 1/2024 | Jiao | |

FOREIGN PATENT DOCUMENTS

| | | | | |
|---|---|---|---|---|
| CN | 109427238 A | | 3/2019 | |
| CN | 111488416 A | * | 8/2020 | G01C 21/30 |
| CN | 111696170 A | | 9/2020 | |
| CN | 111721308 A | | 9/2020 | |
| CN | 112069280 A | | 12/2020 | |
| CN | 112985444 A | | 6/2021 | |
| CN | 114018239 A | * | 2/2022 | G01C 21/3822 |
| CN | 114419145 A | | 4/2022 | |

OTHER PUBLICATIONS

Michael Garman and Jessica Bonnie, "Curvature of Surfaces in 3 Space", https://blogs.goucher.edu/verge/files/2016/01/Curvature_of.pdf (Year: 2016).*
ArcGIS Pro 2.8, "How Simplify Line and Simplify Polygon work" (Year: 2021).*
Xia, machine translation of CN-111488416-A (Year: 2020).*
Feng, machine translation of CN-114018239-A (Year: 2022).*
ArcGIS Pro 2.7, "Densify (Editing)" (Year: 2021).*
The World Intellectual Property Organization (WIPO) International Search Report for PCT/CN2023/075663 May 3, 2023 8 Pages (including translation).
The State Intellectual Property Office of the People's Republic of China (SIPO) Office Action 1 for 202210315545.6 May 10, 2022 9 Pages (including translation).
Bingkun Ci, "Non-official translation: Research on Digital Electronic Maps for Autonomous Vehicle Navigation Systems", Basic Sciences, China Doctoral Dissertations/Master's Theses Tull-Text Database (Master), Jun. 15, 2002 (Jun. 15, 2002), p. A008-59.
Yunpeng Wang et al., "Application Research on Method for Data Format Transformation on Road Informationization of Jilin City Based on SuperMap", The 1st International Conference on Information Science and Engineering (1CISE2009), Dec. 31, 2009 (Dec. 31, 2009), pp. 1995-1998.
The European Patent Office (EPO) The Extended European Search Report for Application No. 23777654.7 Mar. 21, 2025 7 Pages.

* cited by examiner

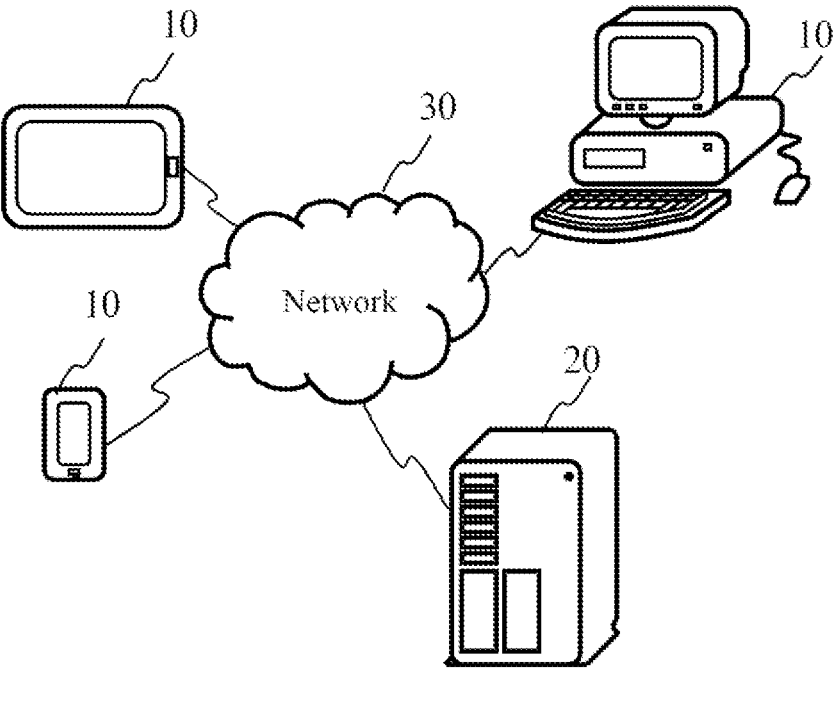

FIG. 1

Obtain a sequence of road geometry line points of a first road in a three-dimensional map, the sequence of road geometry line points including a plurality of location points for drawing an outline of a road geometry of the first road

201

Segment the first road based on the sequence of road geometry line points, to obtain a plurality of road segments of the first road, a road surface of each of the road segments being drawn as a plane

202

Determine, in response to that a target road element spans across a boundary line of two adjacent road segments in the first road, a joint point located on the boundary line, the joint point being configured as a label to divide the target road element to two sections that are respectively placed on the road surfaces of the two adjacent road segments

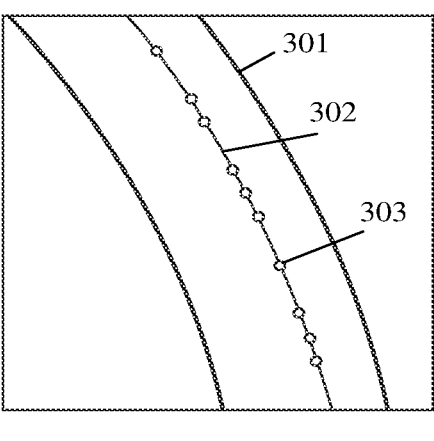

FIG. 3

Extract location points from a road geometry line of the first road, to obtain a sequence of initial road geometry line points corresponding to the first road, the sequence of initial road geometry line points including key location points indicating a road geometry of the first road — 201a Rarefy the location points in the sequence of initial road geometry line points other than the key location points, a sequence of rarefied road geometry line points — 201b Densify the location points of the sequence of rarefied road geometry line points based on a second threshold, to obtain the sequence of road geometry line points, a distance between two adjacent location points in the sequence of road geometry line points being less than or equal to the second threshold — 201c

FIG. 4

Obtain, for a first location point, a second location point, and a third location point arranged adjacent to each other in sequence in the sequence of road geometry line points, a turning point detection result corresponding to the second location point, the turning point detection result indicating whether the second location point is a turning point — 202a Determine one or more road segments corresponding to the second location point based on the turning point detection result — 202b

FIG. 5

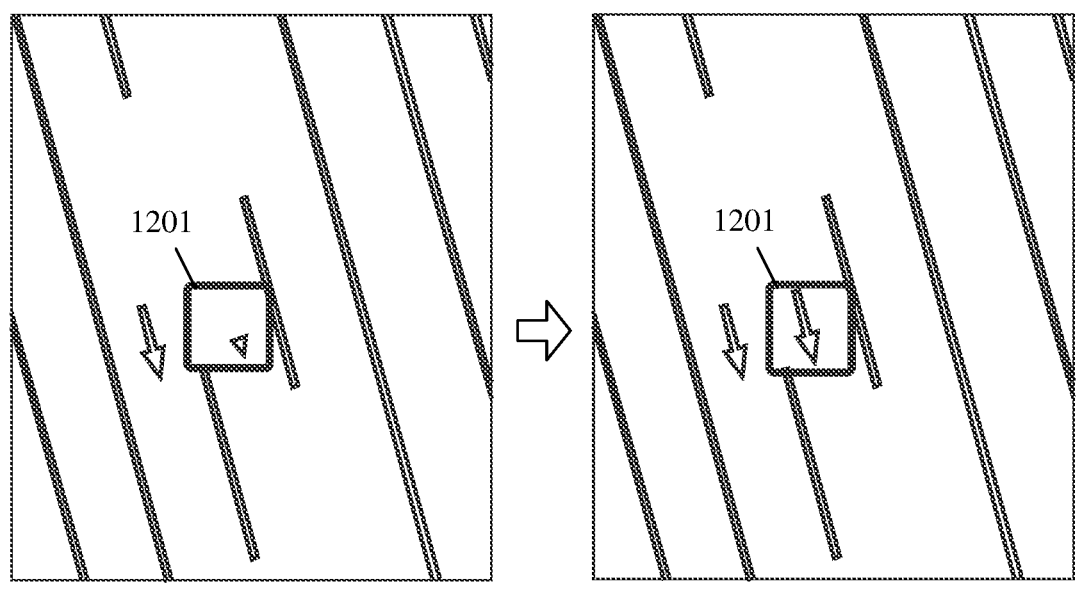

FIG. 12

| 1301 |
| Obtain a sequence of road geometry line points of a first road in a three-dimensional map, the sequence of road geometry line points including a plurality of location points for drawing an outline of a road geometry of the first road |

| 1302 |
| Segment the first road based on the sequence of road geometry line points, to obtain a plurality of road segments of the first road, a road surface of each of the road segments being drawn as a plane |

| 1303 |
| Merge two adjacent road segments in a plurality of road segments satisfying a merging condition, to obtain an optimized road segment sequence of the first road |

| 1304 |
| Determine, in response to that a target road element spans a boundary line of two adjacent road segments in the first road, a joint point located on the boundary line, the joint point being configured as a label to divide the target road element to two sections that are respectively placed on the road surfaces of the two adjacent road segments |

Sequence obtaining module    1501

Road segmentation module    1502

Joint point determination module    1503

METHOD AND APPARATUS FOR LABELING ROAD ELEMENT, DEVICE, AND STORAGE MEDIUM

CROSS-REFERENCES TO RELATED APPLICATIONS

This application is a continuation application of PCT Patent Application No. PCT/CN2023/075663, filed on Feb. 13, 2023, which claims priority to Chinese Patent Application No. 202210315545.6, filed on Mar. 29, 2022 and entitled "METHOD AND APPARATUS FOR LABELING ROAD ELEMENT, DEVICE, AND STORAGE MEDIUM", the entire contents of both of which are incorporated herein by reference.

FIELD OF THE TECHNOLOGY

Embodiments of the present disclosure relate to the technical field of maps, and in particular, to a method and an apparatus for labeling a road element, a device, and a storage medium.

BACKGROUND

In a three-dimensional map (such as a high-precision map), both roads and road elements have height information, and the labeling of the road elements has an important impact on a display effect of the three-dimensional map.

In related art, the road in the three-dimensional map is formed by combining together a plurality of triangular patches. If the road elements are drawn in a plane manner when two adjacent triangular patches are not coplanar, the road elements and the road do not fit. Even, when two adjacent triangular patches forming a road with an upward or downward slope, if the road element is still drawn in the plane manner, the road can overlay and cover the road element, which can make the road element (partially) hidden from view or appear as distorted. Therefore, a reasonable method for labeling a road element is urgently required.

SUMMARY

Embodiments of the present disclosure provide a method and an apparatus for labeling a road element, a device, and a storage medium, which can solve a problem in a three-dimensional map that a road element does not fit a road, and particularly a problem that a road element is overlaid, thereby improving labeling reasonability of road elements. The technical solutions are as follows.

According to an aspect of the present disclosure, a method for labeling a road element is provided. The method is performed by a computer device, and the method includes: obtaining a sequence of road geometry line points of a first road in a three-dimensional map, the sequence of road geometry line points including a plurality of location points for drawing an outline of a road geometry of the first road; segmenting the first road based on the sequence of road geometry line points, to obtain a plurality of road segments of the first road, a road surface a road segment being drawn as a plane; and determining, in response to that a target road element spans a boundary line of two adjacent road segments in the first road, a joint point located on the boundary line, the joint point being configured as a label to divide the target road element to two sections that are respectively placed on the road surfaces of the two adjacent road segments.

According to one aspect of the embodiments of the present disclosure, an apparatus for labeling a road element is provided, and the apparatus includes: a sequence obtaining module, configured to obtain a sequence of road geometry line points of a first road in a three-dimensional map, the sequence of road geometry line points including a plurality of location points for drawing an outline of a road geometry of the first road; a road segmentation module, configured to segment the first road based on the sequence of road geometry line points, to obtain a plurality of road segments of the first road, a road surface of each of the road segments being drawn as a plane; and a joint point determination module, configured to determine, in response to that a target road element spans a boundary line of two adjacent road segments in the first road, a joint point located on the boundary line, the joint point being configured as a label to divide the target road element to two sections that are respectively placed on the road surfaces of the two adjacent road segments.

According to an aspect of the embodiments of the present disclosure, a computer device is provided, including at least one processor and at least one memory, the at least one memory storing a computer program, and the computer program being loaded and executed by the at least one processor to implement the above method for labeling a road element.

For example, the computer device may be a terminal or a server.

According to an aspect of the embodiments of the present disclosure, a non-transitory computer-readable storage medium is provided, storing a computer program, the computer program being loaded and executed by at least one processor to implement the above method for labeling a road element.

The technical solutions provided in embodiments of the present disclosure may include the following beneficial effects.

The road is segmented based on the sequence of road geometry line points to obtain a plurality of road segments corresponding to the road, and each road segment is drawn as a plane. In response to that the road element crosses two road segments that do not belong to the same plane, the road element is segmented (that is broken) based on the joint point on the boundary line, so that the segmented road elements are labeled on different road segments (that is, different planes), thereby solving the problem that a road element does not fit a road and improving labeling reasonability of road elements.

In addition, in response to that the road element spans two road segments that do not belong to the same plane, a road element is not overlaid by the road element through labeling the road element in sections on the road surface of the road segment based on the joint point, which further improves labeling reasonability of road elements.

BRIEF DESCRIPTION OF THE DRAWINGS

FIG. 1 is a schematic diagram of a solution implementation environment according to an embodiment of the present disclosure.

FIG. 2 is a flowchart of a method for labeling a road element according to an embodiment of the present disclosure.

FIG. 3 is a schematic diagram of a sequence of road geometry line points according to an embodiment of the present disclosure.

FIG. 4 is a flowchart of a method for obtaining a sequence of road geometry line points according to an embodiment of the present disclosure.

FIG. 5 is a flowchart of a method for obtaining a road segment according to an embodiment of the present disclosure.

FIG. 12 is a schematic diagram of a display effect of a road element according to an embodiment of the present disclosure.

FIG. 13 is a flowchart of a method for labeling a road element according to another embodiment of the present disclosure.

DESCRIPTION OF EMBODIMENTS

Figure 6:
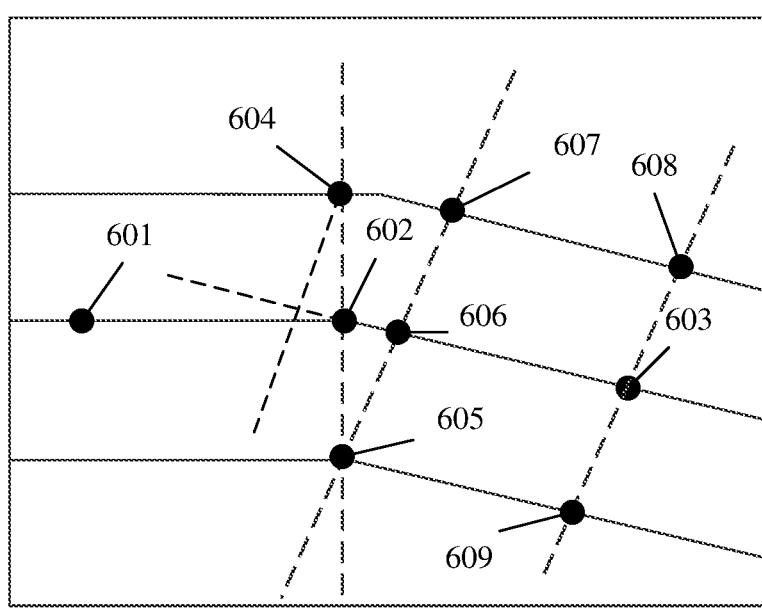
FIG. 6 is a schematic diagram of a method for obtaining a road segment corresponding to a curved road region according to an embodiment of the present disclosure.

To make the objectives, technical solutions, and advantages of the present disclosure clearer, the following further describes implementations of the present disclosure in detail with reference to the accompanying drawings.

FIG. 1 is a schematic diagram of a solution implementation environment according to an embodiment of the present disclosure. The implementation environment may include a terminal 10 and a server 20.

The terminal 10 may be an electronic device such as a mobile phone, a tablet computer, a multimedia playback device, a personal computer (PC), an on-board terminal, and an aircraft. A client of a target application may be installed in the terminal 10. For example, the target application may be a map application, a navigation application, a traffic application, a simulation learning application, and any application with a three-dimensional map display function.

The server 20 is configured to provide a background service for the client of the target application (such as the navigation application) in the terminal 10. For example, the server 20 may be a background server for the above applications (such as the navigation application). The server 20 may be one server, a server cluster including a plurality of servers, or a cloud computing service center.

The terminal 10 and the server 20 may communicate with each other a network 30. The network 30 may be a wired network, or may be a wireless network.

For example, the client of the navigation application is used as an example. The server 20 first determines a plurality of road segments corresponding to a first road in a three-dimensional map, and then determines a joint point of a target road element on the first road. When the client displays the first road, the server 20 provides the client with data corresponding to a plurality of road segments and data corresponding to the joint point, so that the client can label the target road element on the first road segment based on the joint point. In some embodiments, the joint point may be determined by the server 20 in real time, or may be determined and recorded by the server 20 in advance, which is not limited in this embodiment of the present disclosure.

In some embodiments, the joint point may also be determined by the client of the map application. The client, after determining the joint point, directly adds section by section as a label to the target road element of the first road based on the joint point. In some embodiments, the joint point may be determined by the client in real time, or may be determined and recorded by the client in advance, which is not limited in this embodiment of the present disclosure.

FIG. 2 is a flowchart of a method for labeling a road element according to an embodiment of the present disclosure. An execution body of each step of the method may be the terminal 10 or the server 20 in the implementation environment shown in FIG. 1. The method may include the following steps (step 201 to 203).

Step 201: Obtain a sequence of road geometry line points of a first road in a three-dimensional map, the sequence of road geometry line points including a plurality of location points for drawing an outline of a road geometry of the first road.

The three-dimensional map in an embodiment of the present disclosure refers to an electronic map, which may be drawn by the terminal 10 or the server 20, and displayed by the client of the target application (such as the navigation application). In some embodiments, the three-dimensional map may refer to a high-precision map, a three-dimensional electronic map, a traffic road map, or the like, which is not limited in this embodiment of the present disclosure.

The first road may refer to any road in the three-dimensional map. The sequence of road geometry line points may refer to a sequence composed of a plurality of consecutive location points on a road geometry line, and the plurality of consecutive location points can outline the road geometry line of the first road. For example, the sequence of road geometry line points of the first road may reflect a plane position change (position coordinates, or the like) of the first road, a curve change (such as a straight road, a curved road, or the like), a fluctuation change (such as upper ramp or a lower ramp), and the like. The road geometry line may be configured to indicate a road geometry. In some embodiments, a road geometry line of the first road may refer to a road center line of the first road, a road geometry line of the first road may also refer to a lane line of the first road, a road geometry line of the first road may also refer to a road boundary line of the first road, which is not limited in this embodiment of the present disclosure. In some embodiments, a road geometry line of the first road may be determined as a road center line of the first lane, or a physical center line of the first road may be determined as a road center line of the first road. The center line of the road can better represent bending information of the road, which is convenient for determining a subsequent joint point.

In some embodiments, a location point in the sequence of road geometry line points may be represented by (x, y, height), (x, y) representing a plane coordinate of the location point and height representing a height coordinate of the location point.

For example, referring to FIG. 3, the road geometry line of the first road 301 is a road center line 302 of the first road 301, and the sequence of road geometry line points of the first road 301 is composed of a plurality of consecutive center line points 303 (that is road geometry points) on the road center line 302.

In some embodiments, the road geometry of the first road is firstly determined, and the sequence of road geometry line points corresponding to the first road is obtained from the road geometry line of the first road.

In some embodiments, the location point is extracted from the road geometry line of the first road, and the extracted location point is determined as the sequence of road geometry line points of the first road.

In some embodiments, the location point is extracted from the road geometry line of the first road to obtain a sequence of initial road geometry line points corresponding to the first road, and the sequence of initial road geometry line points corresponding to the first road is processed to obtain the sequence of road geometry line points corresponding to the first road.

For example, the sequence of initial road geometry line points corresponding to the first road may be rarefied to obtain the sequence of rarefied road geometry line points, and the sequence of rarefied road geometry line points is determined as the sequence of road geometry line points corresponding to the first road.

For example, location points of the sequence of initial road geometry line points corresponding to the first road may be densified to obtain the densified sequence of road geometry line points, and the densified sequence of road geometry line points is determined as the sequence of road geometry line points corresponding to the first road.

For example, the sequence of initial road geometry line points corresponding to the first road may be rarefied to obtain the sequence of rarefied road geometry line points, and the location points of the sequence of rarefied road geometry line points is densified, to obtain the sequence of road geometry line points.

In an example, referring to FIG. 4, step 201 may further include the following sub-steps.

Step 201*a*: Extract location points from a road geometry line of the first road, to obtain a sequence of initial road geometry line points corresponding to the first road, the sequence of initial road geometry line points including key location points indicating a road geometry of the first road.

In some embodiments, an equidistant extraction of a location point can be performed on the road geometry line, and the equidistant distance may be set and adjusted according to an actual use demand. For example, a location point is extracted every 1 m on the road geometry line to obtain the sequence of initial road geometry line points. In some embodiments, the random extraction manner may also be used for extracting the location point on the road geometry line, which is not limited in this embodiment of the present disclosure.

In the process of extracting the location point, a key location point is necessarily extracted into the sequence of initial road geometry line points. For example, that the road geometry line is the road center line is used an example. The key location point may include a turning point on the road center line, an elevation change point (such as a starting point and a peak point of an upper ramp, or a starting point and a valley point of a lower ramp), or the like (in response to that the road center line is the lane line, the key location point may further include an attribute change point of a lane, such as a location point from a solid line to a dotted solid line). The turning point is a location point where a direction of travel of the road changes in a horizontal direction, such as an inflection point corresponding to the curved road. That is to say, the turning point is a location point that may be configured to indicate a curve change of the road. The elevation change point is a location point that may be configured to indicate the fluctuation change of the road. In some embodiments, the key location point (such as the turning point and the elevation change point) can be determined based on a curvature of the road geometry line.

Step 201*b*: Rarefy (i.e., reduce a quantity of) the location points in the sequence of initial road geometry line points other than the key location points, to obtain a sequence of rarefied road geometry line points.

In the embodiments of the present disclosure, a location point other than the key location point may be referred to as a non-key location point. In some embodiments, the Douglas thinning algorithm can be used for thinning a non-key location point. For example, by using the Glass thinning algorithm, overly dense and non-essential location point in the non-key location point is deleted to retain the necessary non-key location point. At the same time, the key location point in the sequence of road geometry line points is necessarily retained, so as to obtain the sequence of rarefied road geometry line points. In this way, the sequence of rarefied road geometry line points can not only outline the road geometry of the first road, but also reduce a workload of subsequent road segments.

Step 201*c*: Densify the location points of the sequence of rarefied road geometry line points based on a second threshold, to obtain the sequence of road geometry line points, a distance between two adjacent location points in the sequence of road geometry line points being less than or equal to the second threshold.

The second threshold is used for ensuring that the road segment obtained by breaking the road geometry line points tends to a plane and the direction of travel is a straight line. The second threshold can be set and adjusted according to an actual usage requirement, such as 10 m, 9 m, 8 m, and the like. The second threshold also requires to be greater than a target threshold to ensure that the road segment of the first road is not excessively short, which causes an increase in the workload of determining the joint point. The target threshold can be determined based on an empirical value. For example, the road segment obtained by breaking the road geometry line points is approximately a straight road without bending, and the first road formed by remerging the road segment obtained by breaking the road geometry line points can also not lose the road geometry of the first road.

For example, the location point densifying process of the sequence of rarefied road geometry line points may be as follows: inserting, for two adjacent location points in the sequence of rarefied road geometry line points, a location point between the two adjacent location points to obtain a sequence of transitional road geometry line points in response to that a distance between the two adjacent location points is greater than the second threshold; and stopping densifying location points of the diluted sequence of road geometry line points based on a second threshold, to obtain the sequence of road geometry line points, in response to that a distance between two adjacent location points in the sequence of transitional road geometry line points is less than or equal to the second threshold value.

Step 202: Segment the first road based on the sequence of road geometry line points, to obtain a plurality of road segments of the first road, a road surface of each of the road segments being drawn as a plane.

In an embodiment of the present disclosure, each road surface point corresponding to the same road segment is coplanar, that is, each road surface point corresponding to the same road segment is located in the same plane. In this way, when the road element is labeled in the road segment, it is only necessary to label the road surface of the road segment to ensure that the road element is fitted to the road segment, and the road element is not overlaid by the road.

In some embodiments, for the first road segment and the second road segment in the plurality of road segments adjacent to each other, a plane corresponding to the first road segment and a plane corresponding to the second road segment may not be coplanar, and the plane corresponding to the first road segment and the plane corresponding to the second road segment may also be coplanar. This is not limited in this embodiment of the present disclosure. In some embodiments, in response to that the plane corresponding to the first road segment and the plane corresponding to the second road segment is coplanar, if the first road segment and the second road segment are located in the straight area of the first road, the first road segment and the second road segment can be merged into one road segment. If the first road segment and the second road segment are located in the curved road region of the first road, the first road segment and the second road segment cannot be merged.

In an example, step 202 may further include the following sub-steps.

Step 202*a*: Obtain, for a first location point, a second location point, and a third location point that are sequentially arranged in the sequence of road geometry line points, a turning point detection result corresponding to the second location point, the turning point detection result indicating whether the second location point is a turning point.

The second location point may be any location point other than a starting location point and an ending location point in the sequence of road geometry line points. For the starting location point, the plane defined by the starting location point and the vertical line of the road geometry line in the first road, and the location point adjacent to the starting location point and the vertical line of the road geometry line can be determined as the road segment corresponding to the starting location point.

In an example, the obtaining process of the turning point detection result may be as follows: determining the second location point as the turning point in response to that a ray direction from the first location point toward the second location point is different from a ray direction from the second location point toward the third location point; and determining the second location point as a non-turning point in response to that the ray direction from the first location point toward the second location point is the same as the ray direction from the second location point toward the third location point. According to a connection relationship between the first location point, the second location point, and the third location point, it is determined whether the second location point is a turning point, the location point on the curved road segment and the location point at the turning can be screened out as the turning point, which is convenient for subsequent division of the road segment.

For example, referring to FIG. 6, in the curved road region corresponding to the first road, the second location point 602 may be determined as the turning point in response to that a ray direction from the first location point 601 toward the second location point 602 is different from a ray direction from the second location point 602 toward the third location point 603.

Step 202*b*: Determine one or more road segments corresponding to the second location point based on the turning point detection result.

Through the above method, the turning points in the sequence of road geometry line points are detected, and the road is divided into one or more road segments according to the turning points included in the sequence of road geometry line points, so as to ensure that one road segment is located in one plane. The segmented road elements are labeled in different road segments (that is, different planes), thereby solving the problem of the road elements and the road does not fit and improving labeling rationality of the road elements.

In an example, in response to that the second location point is the turning point, the determination process of the road segment may include the following.

1. Obtaining the first boundary point and the second boundary point corresponding to the second location point, the first boundary point and the second boundary point being two intersection points between a first straight line (i.e., a line passing through the second location point and perpendicular to a connecting line between the first location point and the second location point) and a road boundary of the first road.

In some embodiments, the first boundary point may refer to any one of the two intersection points, and the second boundary point is the other intersection point of the two intersection points other than the first boundary point.

For example, referring to FIG. 6, for the second location point 602, a vertical line connected to the first location point 601 and the second location point 602 is drawn through the second location point 602. The two intersection points of the vertical line and the road boundary of the first road are a first boundary point 604 and a second boundary point 605.

2. Determining a third boundary point based on the first boundary point and the second boundary point, the third boundary point being an intersection point between a second straight line and the road boundary of the first road, the second straight line being a line passing through the first boundary point or the second boundary point and perpendicular to a connecting line between the second location point and the third location point.

In some embodiments, determining a target boundary point from the first boundary point and the second boundary point, a fourth straight line (i.e., a line passing through the target boundary point and perpendicular to the connecting line between the second location point and the third location point) intersecting a ray from the second location point toward the third location point; and determining the other intersection point of the two intersection points between the fourth straight line (i.e., the line passing through the target boundary point and perpendicular to the connecting line between the second location point and the third location point) and the road boundary of the first road other than the target boundary point as the third boundary point, an elevation of the third boundary point being set to be the same as an elevation of the second location point.

For example, referring to FIG. 6, vertical lines connecting the line with the second location point 602 and the third location point 603 are respectively drawn through the first boundary point 604 and the second boundary point 605. Since the vertical line corresponding to the second boundary point 605 intersects the ray of the second location point 602 pointing to the third location point 603, and the vertical line corresponding to the first boundary point 604 intersects the ray of the third location point 603 pointing to the second location point 602, the second boundary point 605 can be determined as the target boundary point. Further, an intersection point 607 with the road boundary of the first road may be determined as the third boundary point (hereinafter referred to as the third boundary point 607) of a straight line (e.g., the fourth straight line) passing through the second boundary point 605 and perpendicular to the line connecting between the second location point 602 and the third location point 603. In some embodiments, an elevation of the third boundary point 607 may be set to an elevation of the second location point 602.

Through the above method, the third boundary point is determined to ensure that the third boundary point is at an edge of the road and is located on the same plane as the first boundary point and the second boundary point, so that the determined plane fits the road.

In some embodiments, the intersection point between the vertical line corresponding to the target boundary point and the road element or the intersection point between the connection line and the road element between the first boundary point and the second boundary point can be stored together with the element shape point corresponding to the road element, which can help determine the joint point of the road element at the road segment corresponding to the second location point. For example, the intersection point is directly determined as the joint point corresponding to the road element. The road element refers to an element of a road displayed on a three-dimensional map, such as a road line, a road surface pointing arrow, a zebra crossing, and the like. The element shape point corresponding to the road element is configured to indicate the shape of the road element. In the embodiments of the present disclosure, a joint point refers to a location point for breaking a road element which spans a road segment, and the broken road element may be added section by section to the road surface of the road segments spanned by the road element.

3. Determining a plane defined by the first boundary point, the second boundary point, and the third boundary point as a curved road segment corresponding to the second location point.

For example, referring to FIG. 6, a plane defined by the first boundary point 604, the second boundary point 605, and the third boundary point 607 in the first road is determined as a curved road segment corresponding to the second location point 602. Since three points can determine a plane, the first boundary point 604, the second boundary point 605 and the third boundary point 607 must be coplanar.

4. Obtaining a fourth boundary point and a fifth boundary point corresponding to the third location point in response to that the third location point is not located in the curved road segment, the fourth boundary point and the fifth boundary point being two intersection points between a third straight line and the road boundary of the first road, the third straight line being a line passing through the third location point and perpendicular to the connecting line between the second location point and the third location point.

For example, referring to FIG. 6, the third location point 603 is located on a right side of the second location point, that is, the third location point 603 is not located in the curved road segment. A vertical line connected to the second location point 602 and the third location point 603 is drawn through the third location point 603 to obtain two intersection points between the vertical line and the road boundary of the first road. The two intersection points are a fourth boundary point 608 and a fifth boundary point 609.

In some embodiments, updating the third location point to an intersection point between a fifth straight line and a line connecting the third location point and the fourth location point in response to that the third location point is located in the curved road segment, the fifth straight line being a line passing through the target boundary point corresponding to the third boundary point and the third boundary point, and the fourth location point being another location point in the sequence of road geometry line points adjacent to the third location point other than the second location point.

For example, based on FIG. 6, in response to the third boundary point 607 is located in the curved road segment, an intersection point 606 of the second boundary point 605 and the third boundary point 607 with the ray of the second location point 602 pointing to the third location point 603 (or, an intersection point of the line between the third location point 603 and the fourth location point (not shown in FIG. 6)) is determined as a new third location point, and the third location point 603 is removed.

Through the above method, the third location point is updated so that the third location point fits the curved road segment.

5. Determining a remaining plane obtained after the curved road segment is removed from a plane defined by the first boundary point, the second boundary point, the fourth boundary point, and the fifth boundary point as a straight road segment corresponding to the second location point.

For example, referring to FIG. 6, a remaining plane obtained after the curved road segment is removed from a plane defined by the first boundary point 604, the second boundary point 605, the fourth boundary point 608, and the fifth boundary point 609 is determined as a straight road segment corresponding to the second location point 602. That is to say, the plane defined by the second boundary point 605, the third boundary point 607, the fourth boundary point 608, and the fifth boundary point 609 is determined as the straight road segment corresponding to the second location point 602. The third boundary point 607 and the fourth boundary point 608 are located on the same road boundary, the second boundary point 605 and the fifth boundary point 609 are located on the same boundary. A connecting line between the second boundary point 605 and the third boundary point 607 is perpendicular to a line between the second location point 602 and the third location point 603, and a connecting line between the fourth boundary point 608 and the fifth boundary point 609 is also perpendicular to a connecting line between the second location point 602 and the third location point 603. Therefore, the second boundary point 605, the third boundary point 607, the fourth boundary point 608, and the fifth boundary point 609 are coplanar.

In some embodiments, the curved road segment and the straight road segment may be merged to obtain a road segment corresponding to the second location point, in response to that a difference between an elevation of the third boundary point and an elevation of the third location point is less than or equal to a first threshold value.

The first threshold value can be adaptively set and adjusted according to actual usage, such as 0.5 cm, 0.6 cm, 1 cm, and the like. For example, when the road element is labeled 1 cm above the road surface of the road, a user of the three-dimensional map is imperceptible. Even when viewed from a side, the user of the three-dimensional map cannot easily perceive the road element. Therefore, in response to that the road element is labeled higher than the first threshold of the road surface, if a difference between an elevation of the third boundary point and an elevation of the second location point is less than or equal to a first threshold value, the curved road segment and the straight road segment can be merged, which can help reduce the joint point, thereby reducing the workload of determining the joint point. In some embodiments, all road elements in the three-dimensional map can be labeled at the first threshold above the road surface, or only for the curved road segment and the straight road segment adjacent to the curved road segment. This is not limited in this embodiment of the present disclosure.

Figure 7:
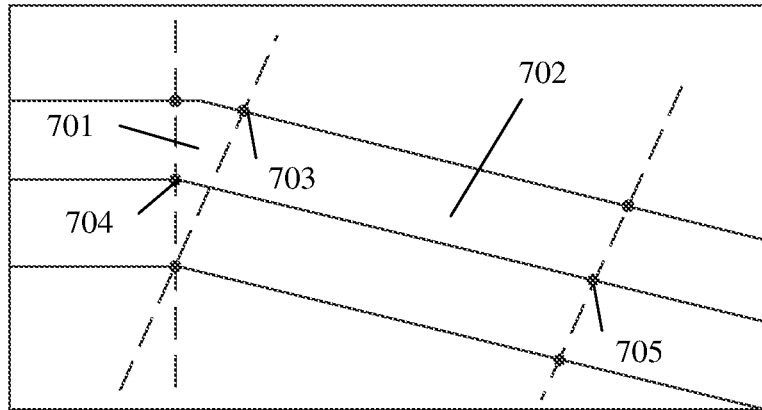
FIG. 7 is a schematic diagram of a method for merging a road segment corresponding to a curved road region according to an embodiment of the present disclosure.

For example, referring to FIG. 7, for the curved road segment 701 and the straight road segment 702 corresponding to the second location point 704, if the difference between the elevation of the third boundary point 703 and the elevation of the third location point 705 is less than or equal to 1 cm, the curved road segment 701 and the straight road segment 702 are merged to obtain the road segment corresponding to the second location point 704.

An elevation of each road surface point in the curved road segment may be adjusted based on coordinate information of the first boundary point, coordinate information of the second boundary point, coordinate information of the fourth boundary point, and coordinate information of the fifth boundary point.

Figure 8:
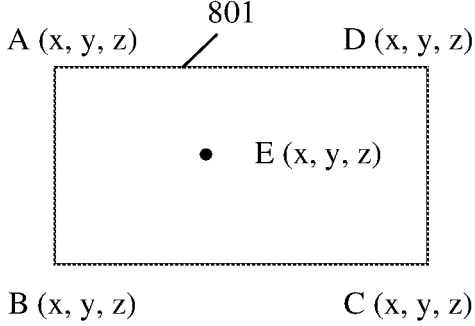
FIG. 8 is a schematic diagram of a method for determining elevation of a road surface point according to an embodiment of the present disclosure.

For example, referring to FIG. 8, for any point E in the target road segment 801 corresponding to the first road (that is, the plane defined by the boundary points A, B, C, and D), since E is coplanar with boundary points A, B, C, and D, real numbers m and n exist, so that the vector BE can be expressed as: m*vector BA+n*vector BC.

Further, it may be learned that $E \cdot x - B \cdot x = m*(A \cdot x - B \cdot x) + n*(C \cdot x - B \cdot x)$ and $E \cdot y - B \cdot y = m*(A \cdot y - B \cdot y) + n*(C \cdot y - B \cdot y)$. $E \cdot x$, $A \cdot x$, $B \cdot x$, and $C \cdot x$ refer to x-axis coordinates of E, A, B, and C respectively. $E \cdot y$, $A \cdot y$, $B \cdot y$, and $C \cdot y$ refer to y-axis coordinates of E, A, B, and C, respectively.

Through solving the equation, it may be learned that: if $C \cdot x$ is equal to $B \cdot x$, $m = (E \cdot x - B \cdot x)/(A \cdot x - B \cdot x)$, and $n = (E \cdot y - m*(A \cdot y - B \cdot y))/(C \cdot y - B \cdot y)$; and if $C \cdot x$. is not equal to $B \cdot x$., $m = ((E \cdot y - B \cdot y) - (E \cdot x - B \cdot x)/(C \cdot x - B \cdot x)*(C \cdot y - B \cdot y))/((A \cdot y - B \cdot y) - (A \cdot x - B \cdot x)/(C \cdot x - B \cdot x)*(C \cdot y - B \cdot y))$, and $n = (E \cdot x - B \cdot x)/(C \cdot x - B \cdot x) - (A \cdot x - B \cdot x)/(C \cdot x - B \cdot x)*m$.

Based on the above, $E \cdot z = B \cdot z + m*(A \cdot z - B \cdot z) + n*(C \cdot z - B \cdot z)$, where $E \cdot z$, $A \cdot z$, $B \cdot z$, and $C \cdot z$ refer to z-axis coordinates (that is, elevations) of E, A, B, and C, respectively.

In some embodiments, the elevation of each road surface point in the curved road segment is the same, and the elevation of each road surface point in the straight road segment is not necessarily the same. Whether it is the elevation of each road surface point in the curved road segment, or the elevation of each road surface point in the straight road segment, the elevation determination method of the above road surface point may also be used to determine.

In some embodiments, for a road area where the elevation change in the first road is less than or equal to the first threshold, the road element can be labeled directly at the first threshold on the road surface of the road region without breaking the road region, thereby further reducing the workload of road segmentation.

Through the above method, in response to that the second location is the turning point, the curved road segment and the straight road segment corresponding to the second location are determined. The road elements are segmented (that is, broken) based on the turning points, so that the segmented road elements are labeled on different sections (that is, different planes), thereby solving the problem that a road element does not fit a road and improving labeling reasonability of road elements.

In another example, in response to that the second location point is not the turning point, the determination process of the road segment may include the following.

1. Obtaining a first boundary point and a second boundary point corresponding to the second location point, and a fourth boundary point and a fifth boundary point corresponding to the third location point, the first boundary point and the second boundary point being two intersection points of a road boundary of the first road that pass through the second location point and are perpendicular to a connecting line between the first location point and the second location point; and the fourth boundary point and the fifth boundary point being two intersection points between the road boundary of the first road and a straight line (i.e., the third straight line) passing through the third location point and perpendicular to the connecting line between the second location point and the third location point.

Figure 9:
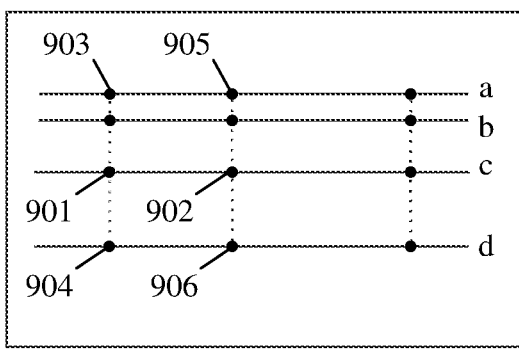
FIG. 9 is a schematic diagram of a method for obtaining a road segment corresponding to a straight road region according to an embodiment of the present disclosure.

For example, in FIG. 9, in the straight line region of the first road, a straight line a and a straight line d are road boundaries of the first road, b is a road route, and c is a road geometry line (such as a road center line). For the second location point 901 and the third location point 902 on the road geometry line, a vertical line of the second location point 901 and the road geometry line is drawn to obtain two intersection points between the vertical line and the road boundary of the first road, which are a first boundary point 903 and a second boundary point 904; and a vertical line of the third location point 902 and the road geometry line is drawn to obtain two other points intersection points between the vertical line and the road boundary of the first road, which are a fourth boundary point 905 and a fifth boundary point 906.

2. Determining a plane defined by the first boundary point, the second boundary point, the fourth boundary point, and the fifth boundary point as a road segment corresponding to the second location point.

For example, referring to FIG. 9, a plane defined by the first boundary point 903, the second boundary point 904, the fourth boundary point 905, and the fifth boundary point 906 in the first road is determined as a road segment corresponding to the second location point 901. An elevation of the first boundary point 903 is equal to an elevation of the second boundary point 904, and an elevation of the fourth boundary point 905 is equal to an elevation of the fifth boundary point 906. A connecting line between the first boundary point 903 and the second boundary point 904 is perpendicular to the road geometry line (a straight line), and a connecting line between the fourth boundary point 905 and the fifth boundary point 906 is perpendicular to the road geometry line (a straight line). Therefore, the first boundary point 903, the second boundary point 904, the fourth boundary point 905, and the fifth boundary point 906 are coplanar.

Figure 10:
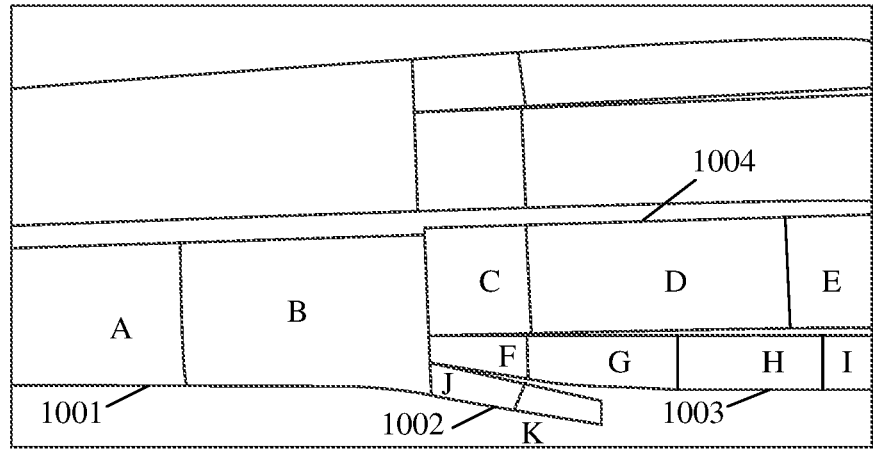
FIG. 10 is a schematic diagram of a segmented road according to an embodiment of the present disclosure.

For example, referring to FIG. 10, a road 1001 diverts out of three roads: a road 1002, a road 1003, and a road 1004. The road 1001 is segmented into a road segment A and a road segment B, the road 1002 is segmented into a road segment J and a road segment K, the road 1003 is segmented into a road segment F, a road segment G, a road segment H, and a road segment I, and the road 1004 is segmented into a road segment C, a road segment D, and a road segment E.

In some embodiments, when modeling the road, the triangular patch is drawn separately in each road segment, that is, the triangular patch that spans the road segment does not exist.

Through the above method, in response to that the second location point is not the turning point, the road segment between the second location point and the third location point is determined to be a road segment corresponding to the second location point, so as to facilitate subsequent merging of the road segment.

Step 203: Determine, in response to that a target road element spans a boundary line of two adjacent road segments in the first road, a joint point located on the boundary line, the joint point being configured as a label to divide the target road element to two sections that are respectively placed on the road surfaces of the two adjacent road segments. In some embodiments, the target road element is added on to the road surface section by section based on the corresponding road segment, each section of the target road element has a one-to one correspondence with one road segment and is placed on its corresponding road segment.

The boundary line is a connecting line between two adjacent road segments. In some embodiments, the connecting line is the line between the first boundary point and the second boundary point corresponding to the second location point. The target road element can refer to any road element. If the target road element spans the boundary line of two adjacent road segments in the first road, it represents that the target road element spans two different planes, and the boundary line is a common line of the two planes.

In an example, the process of determining the joint point may be as follows: determining a target plane perpendicular to the target road element and the two adjacent road segments; and determining an intersection point between the target plane and the boundary line determined as the joint point.

Figure 11:
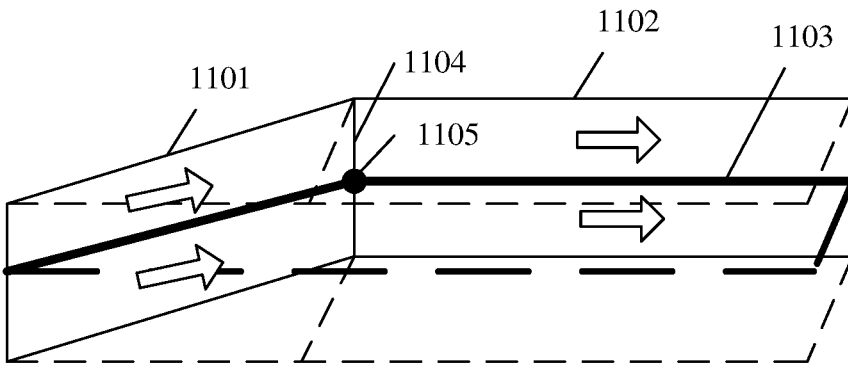
FIG. 11 is a schematic diagram of a method for determining a joint point according to an embodiment of the present disclosure.

For example, referring to FIG. 11, the target road element 1103 (road line) spans the road segment 1101 and the road segment 1102 adjacent to each other. An intersection point 1105 between the target road element 1103 and a target plane perpendicular to the road segment 1101 and the road segment 1102 (that is, a plane defined by a bold line in FIG. 11) and the boundary line 1104 is determined as the joint point.

After determining the joint point, the target road element 1103 is broken at the joint point, a part of the road element 1103 to left of the joint point is attached and labeled on a road surface of the road segment 1101, and a part of the road element 1103 to right of the joint point is attached and labeled on the road surface of the road segment 1102. In this way, the problem that a road element does not fit a road, and the problem that a road element is overlaid can be solved.

For example, referring to FIG. 12, after adopting the road element labeling method provided by the embodiment of the present disclosure, the road element 1201 is no longer overlaid by the road.

Based on the above, the technical solution provided by the embodiment of the present disclosure segments the road by segmenting the road based on the sequence of road geometry line points to obtain a plurality of road segments corresponding to the road, and each road segment is drawn as a plane. In response to that the road element spans two road segments that do not belong to the same plane, the road element is segmented (that is broken) based on the joint point on the boundary line, so that the segmented road elements are labeled on different road segments (that is, different planes), thereby solving the problem that a road element does not fit a road and improving labeling reasonability of road elements.

In addition, in response to that the road element spans two road segments that do not belong to the same plane, a road element is not overlaid by the road element through labeling the road element in sections on the road surface of the road segment based on the joint point, which further improves labeling reasonability of road elements.

Besides, in response to that the elevation change between the curved road segment and the straight road segment adjacent to the curved road segment is less than or equal to the first threshold, the curved road segment and the straight road segment are merged to further reduce the workload of determining the joint point.

FIG. 13 is a flowchart of a method for labeling a road element according to another embodiment of the present disclosure. An execution body of each step of the method may be the terminal 10 or the server 20 in the implementation environment shown in FIG. 1. The method may include the following steps (step 1301 to 1304).

Step 1301: Obtain a sequence of road geometry line points of a first road in a three-dimensional map, the sequence of road geometry line points including a plurality of location points for drawing an outline of a road geometry of the first road.

Step 1302: Segment the first road based on the sequence of road geometry line points, to obtain a plurality of road segments of the first road, a road surface of each of the road segments being drawn as a plane.

Step 1301 and step 1302 are the same in the foregoing embodiment. Reference may be made to the foregoing embodiment for details not described in step 1301 and step 1302. Details are not described herein again.

Step 1303: Merge two adjacent road segments in a plurality of road segments satisfying a merging condition, to obtain an optimized road segment sequence of the first road.

In some embodiments, the plurality of road segment sequences in step 1302 can be referred to simply as road segment sequences, and the optimized road segment sequences refer to road segment sequences obtained by merging two adjacent road segment sequences that satisfy the merging condition. A quantity of road segments in the optimized road segment sequences is less than a quantity of road segments in the road segments sequence, which can reduce the quantity of joint points, thereby reducing the workload of determining the joint points.

In an example, merging, for the first road segment and the second road segment in a plurality of road segments of the first road adjacent to each other, the first road segment and the second road segment to obtain a merged road segment in response to that a sequence of road geometry line points composed of location points corresponding to the first road segment and location points corresponding to the second road segment changes linearly.

In response to that the first road segment and the second road segment are in the straight region of the first road, if a sequence of road geometry line points composed of location points corresponding to the first road segment and location points corresponding to the second road segment changes linearly, it represents that the plane corresponding to the first road segment is coplanar with the plane corresponding to the second road segment. Therefore, in this case, the merging of the first road segment and the second road segment does not affect the labeling of the target road element.

In another example, merging, for the first road segment and the second road segment in the plurality of road segments of the first road adjacent to each other, the first road segment and the second road segment to obtain a merged road segment, in response to that an angle between a direction of travel corresponding to the first road segment and a direction of travel corresponding to the second road segment is less than a third threshold.

The third threshold may be set and adjusted according to an actual usage requirement. For example, in a target region (a length of the target region is less than a set threshold) where the first road segment and the second road segment are located in the first road, if an angle between a direction of travel corresponding to the first road segment and a direction of travel corresponding to the second road segment is less than a third threshold, it represents that the direction of travel corresponding to the first road segment and the direction of travel corresponding to the second road segment tend to be collinear. Therefore, in this case, the merging of the first road segment and the second road segment does not affect the labeling of the target road element.

In some embodiments, a transition road segment may also be added between roads, to achieve a smooth transition between roads. The transition road segment may further be added to the above optimized road segment sequence. The obtaining process of the transition road segment may be as follows: defining, for the first road and a second road connected to the first road, a first transition road segment from the last road segment of the first road and a second transition road segment from the beginning road segment of the second road, the last road segment being a road segment in the first road adjacent to the second road, the beginning road segment being a road segment in the second road adjacent to the first road, and the first transition road segment and the second transition road segment being connected based on a first intersection line between the first road and the second road; and merging the first transition road segment and the second transition road segment, to obtain a transition road segment between the first road and the second road.

Figures 14, 15:
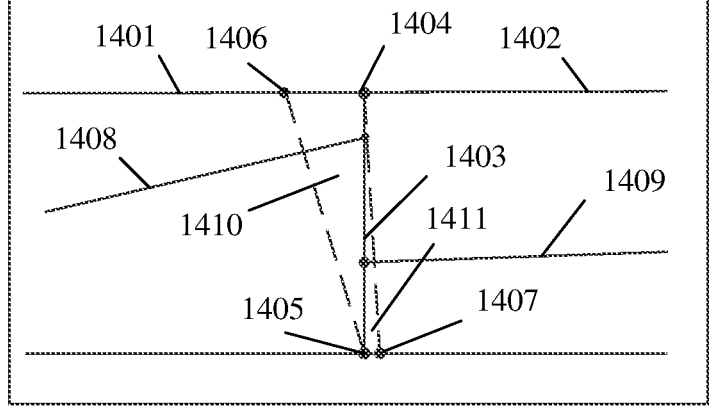
FIG. 14 is a schematic diagram of a method for obtaining a transition road segment according to an embodiment of the present disclosure.
FIG. 15 is a block diagram of an apparatus for labeling a road element according to an embodiment of the present disclosure.

For example, referring to FIG. 14, for the first road 1401 and the second road 1402, a first transition road segment 1410 (that is, a road segment defined by points 1404, 1405, and 1406) is divided from the last road segment of the first road 1401, and a second transition road segment 1411 (that is, a road segment defined by points 1404, 1405, and 1407) is divided from the beginning road segment of the second road 1402. The elevation of each road surface point in the first transition road segment 1410 is the same as the elevation of each road surface point in the second transition road segment 1411. The first transition road segment 1410 and the second transition road segment 1411 are merged to obtain a transition road segment between the first road and the second road.

In some embodiments, The determining process of the first transition road segment and the second transition road segment may be as follows: obtaining a first intersection point and a second intersection point corresponding to the first intersection line, the first intersection point and the second intersection point being two intersection points between a road boundary of the first road and a road boundary of the second road; drawing a vertical line perpendicular to a road geometry line of the last road segment and passing through the first intersection point and the second intersection point, and drawing a vertical line perpendicular to a road geometry line of the beginning road segment and passing through the first intersection point and the second intersection point; and determining, in response to that a foot of a perpendicular of the first intersection point on the road geometry line corresponding to the last road segment is located in the last road segment, a plane defined by a vertical line between the first intersection point and the road geometry line of the last road segment and the first intersection line in the last road segment as the first transition road segment, and determining a plane defined by a vertical line between the second intersection point and the road geometry line of the beginning road segment and the first intersection line in the beginning road segment as the second transition road segment.

For example, referring to FIG. 14, the connection between the first intersection point 1404 and the second intersection point 1405 corresponding to the first road 1401 and the second road 1402 is a first intersection line 1403 between the first road 1401 and the second road 1402. If a vertical line between the second intersection point 1405 and the road geometry line 1408 of the first road 1401 intersects the road geometry line 1408, a plane formed by the vertical line between the second intersection point 1405 and the road geometry line 1408, the road boundary of the first road 1401 and the first intersection line 1403 in the first road 1401 can be determined as the first transition road segment 1410. If a vertical line between the first intersection point 1404 and the road geometry line 1409 of the second road 1402 intersects the road geometry line 1409, a plane formed by the vertical line between the first intersection point 1404 and the road geometry line 1409, the road boundary of the second road 1402 and the first intersection line 1403 in the second road 1402 can be determined as the second transition road segment 1411.

According to the intersection line between the roads, the transition road segment of the road is determined, and the information of the two roads is considered to avoid excessive optimization of the road, which causes the road to be inaccurate.

Step 1304: Determine, in response to that a target road element spans a boundary line of two adjacent road segments in the first road, a joint point located on the boundary line, the joint point being configured as a label to divide the target road element to two sections that are respectively placed on the road surfaces of the two adjacent road segments.

In some embodiments, the above two adjacent road segments belong to the optimized road segment sequence. The method for determining the joint point in step 1304 is the same as that described in the above embodiment. Reference may be made to the foregoing embodiment for details not described in step 1304. Details are not described herein again.

Based on the above, the technical solution provided by the embodiment of the present disclosure segments the road by segmenting the road based on the sequence of road geometry line points to obtain a plurality of road segments corresponding to the road, and each road segment is drawn as a plane. In response to that the road element spans two road segments that do not belong to the same plane, the road element is segmented (that is broken) based on the joint point on the boundary line, so that the segmented road elements are labeled on different road segments (that is, different planes), thereby solving the problem that a road element does not fit a road and improving labeling reasonability of road elements.

In addition, in response to that the road element spans two road segments that do not belong to the same plane, a road element is not overlaid by the road element through labeling the road element in sections on the road surface of the road segment based on the joint point, which further improves labeling reasonability of road elements.

In addition, by merging two adjacent road segments whose sequence of road geometry line points changes linearly, and by merging two adjacent road segments whose angle between the direction of travels is less than the third threshold, the number of joint points is reduced, thereby reducing the workload of determining the joint points.

The following describes apparatus embodiments of the present disclosure, which can be used for executing the method embodiments of the present disclosure. For details not disclosed in the apparatus embodiments of the present disclosure, refer to the method embodiments of the present disclosure.

FIG. 15 is a block diagram of an apparatus for labeling a road element according to an embodiment of the present disclosure. The apparatus has a function of performing the foregoing method embodiments, the function may be implemented by hardware or may be implemented by hardware executing corresponding software. The apparatus may be the computer device described above, or may be arranged on the computer device. As shown in FIG. 15, the apparatus 1500 includes: a sequence obtaining module 1501, a road segmentation module 1502, and a joint point determination module 1503.

The sequence obtaining module 1501 is configured to obtain a sequence of road geometry line points of a first road in a three-dimensional map, the sequence of road geometry line points including a plurality of location points for drawing an outline of a road geometry of the first road.

The road segmentation module 1502 is configured to segment the first road based on the sequence of road geometry line points, to obtain a plurality of road segments of the first road, a road surface of each of the road segments being drawn as a plane.

The joint point determination module 1503 is configured to determine, in response to that a target road element spans a boundary line of two adjacent road segments in the first road, a joint point located on the boundary line, the joint point being configured as a label to divide the target road element to two sections that are respectively placed on the road surfaces of the two adjacent road segments.

In an exemplary embodiment, the joint point determination module 1503 is configured to:

determine a target plane perpendicular to the target road element and the two adjacent road segments; and determine an intersection point between the target plane and the boundary line as the joint point.

Figure 16:
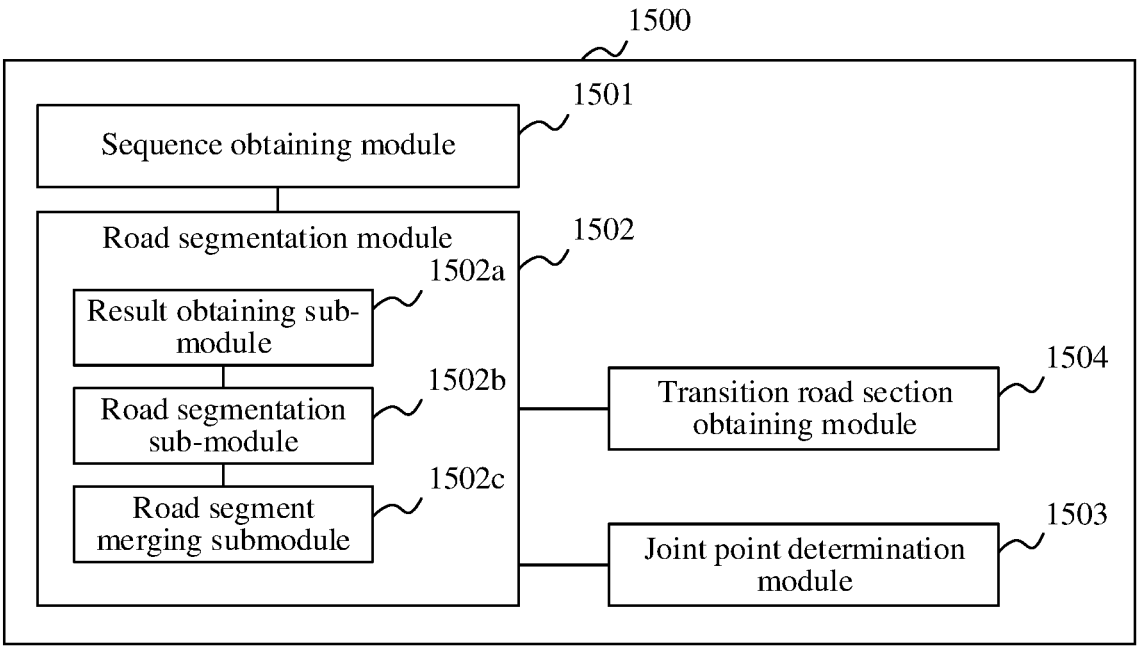
FIG. 16 is a block diagram of an apparatus for labeling a road element according to another embodiment of the present disclosure.

In an exemplary embodiment, as shown in FIG. 16, the road segmentation module 1502 includes a result obtaining sub-module 1502a and a road segmentation sub-module 1502b.

The result obtaining sub-module 1502a is configured to obtain, for a first location point, a second location point, and a third location point that are sequentially arranged in the sequence of road geometry line points, a turning point detection result corresponding to the second location point, the turning point detection result indicating whether the second location point is a turning point.

The road segmentation sub-module 1502b is configured to determine one or more road segments corresponding to the second location point based on the turning point detection result.

In an exemplary embodiment, the road segmentation sub-module 1502b is configured to:

obtain a first boundary point and a second boundary point corresponding to the second location point in response to that the second location point is the turning point, the first boundary point and the second boundary point being two intersection points between a straight line passing through the second location point and perpendicular to a connecting line between the first location point and the second location point and a road boundary of the first road;

determine a third boundary point based on the first boundary point and the second boundary point, the third boundary point being an intersection point between a straight line passing through the first boundary point or the second boundary point and perpendicular to a connecting line between the second location point and the third location point and the road boundary of the first road;

determine a plane defined by the first boundary point, the second boundary point, and the third boundary point as a curved road segment corresponding to the second location point;

obtain a fourth boundary point and a fifth boundary point corresponding to the third location point in response to that the third location point is not located in the curved road segment, the fourth boundary point and the fifth boundary point being two intersection points between a straight line passing through the third location point and perpendicular to the connecting line between the second location point and the third location point and the road boundary of the first road; and determine a remaining plane obtained after the curved road segment is removed from a plane defined by the first boundary point, the second boundary point, the fourth boundary point, and the fifth boundary point as a straight road segment corresponding to the second location point.

In an exemplary embodiment, the road segmentation sub-module 1502b is further configured to:

determine a target boundary point from the first boundary point and the second boundary point, a straight line passing through the target boundary point and perpendicular to the connecting line between the second location point and the third location point intersecting a ray from the second location point toward the third location point; and determine the other intersection point of the two intersection points between the straight line passing through the target boundary point and perpendicular to the connecting line between the second location point and the third location point and the road boundary of the first road other than the target boundary point as the third boundary point, an elevation of the third boundary point being set to be the same as an elevation of the second location point.

In an exemplary embodiment, the road segmentation sub-module 1502b is further configured to:

update the third location point to an intersection point between a straight line passing through the target boundary point corresponding to the third boundary point and the third boundary point and a connecting line between the third location point and the fourth location point in response to that the third location point is located in the curved road segment, the fourth location point being another location point in the sequence of road geometry line points adjacent to the third location point other than the second location point.

In an exemplary embodiment, as shown in FIG. 16, the road segmentation module 1502 further includes a road segment merging sub-module 1502*c*.

The road segment merging sub-module 1502*c* is configured to merge the curved road segment and the straight road segment to obtain a road segment corresponding to the second location point in response to that a difference between an elevation of the third boundary point and an elevation of the third location point is less than or equal to a first threshold, an elevation of each road surface point in the curved road segment being adjusted based on coordinate information of the first boundary point, coordinate information of the second boundary point, coordinate information of the fourth boundary point, and coordinate information of the fifth boundary point.

In an exemplary embodiment, the road segmentation sub-module 1502*b* is further configured to:

obtain a first boundary point and a second boundary point corresponding to the second location point, and a fourth boundary point and a fifth boundary point corresponding to the third location point in response to that the second location point is not the turning point, the first boundary point and the second boundary point being two intersection points between a straight line passing through the second location point and perpendicular to a connecting line between the first location point and the second location point and a road boundary of the first road; the fourth boundary point and the fifth boundary point being two intersection points between a straight line passing through the third location point and perpendicular to the connecting line between the second location point and the third location point and the road boundary of the first road; and determine a plane defined by the first boundary point, the second boundary point, the fourth boundary point, and the fifth boundary point as a road segment corresponding to the second location point.

In an exemplary embodiment, the result obtaining sub-module 1502*a* is further configured to:

determine the second location point as the turning point in response to that a ray direction from the first location point toward the second location point is different from a ray direction from the second location point toward the third location point; and determine the second location point as a non-turning point in response to that the ray direction from the first location point toward the second location point is the same as the ray direction from the second location point toward the third location point.

In an exemplary embodiment, the sequence obtaining module 1501 is configured to:

extract location points from a road geometry line of the first road, to obtain a sequence of initial road geometry line points corresponding to the first road, the sequence of initial road geometry line points including key location points indicating a road geometry of the first road;

rarefy the location points in the sequence of initial road geometry line points other than the key location points, to obtain a sequence of rarefied road geometry line points; and densify the location points of the sequence of rarefied road geometry line points based on a second threshold, to obtain the sequence of road geometry line points, a distance between two adjacent location points in the sequence of road geometry line points being less than or equal to the second threshold.

In an exemplary embodiment, the result obtaining sub-module 1502*a* is further configured to:

insert, for two adjacent location points in the sequence of rarefied road geometry line points, a location point between the two adjacent location points to obtain a sequence of transitional road geometry line points in response to that a distance between the two adjacent location points is greater than the second threshold; and stop densifying the location points of the sequence of rarefied road geometry line points based on the second threshold to obtain the sequence of road geometry line points in response to that a distance between two adjacent location points in the sequence of transitional road geometry line points is less than or equal to the second threshold.

In an exemplary embodiment, the road geometry line of the first road is a road center line of the first road.

In an exemplary embodiment, as shown in FIG. 16, the apparatus 1500 further includes a transition road segment obtaining module 1504.

The transition road segment obtaining module 1504 is configured to define, for the first road and a second road connected to the first road, a first transition road segment from the last road segment of the first road and a second transition road segment from the beginning road segment of the second road, the last road segment being a road segment in the first road adjacent to the second road, the beginning road segment being a road segment in the second road adjacent to the first road, and the first transition road segment and the second transition road segment being connected based on a first intersection line between the first road and the second road.

The transition road segment obtaining module 1504 is further configured to merge the first transition road segment and the second transition road segment, to obtain a transition road segment between the first road and the second road.

In an exemplary embodiment, the transition road segment obtaining module 1504 is further configured to:

obtain a first intersection point and a second intersection point corresponding to the first intersection line, the first intersection point and the second intersection point being two intersection points between a road boundary of the first road and a road boundary of the second road;

draw a vertical line perpendicular to a road geometry line of the last road segment and passing through the first intersection point and the second intersection point, and draw a vertical line perpendicular to a road geometry line of the beginning road segment and passing through the first intersection point and the second intersection point; and determine, in response to that a foot of a perpendicular of the first intersection point on the road geometry line corresponding to the last road segment is located in the last road segment, a plane defined by a vertical line between the first intersection point and the road geometry line of the last road segment and the first intersection line in the last road segment as the first transition road segment, and determine a plane defined by a vertical line between the second intersection point and the road geometry line of the beginning road segment and the first intersection line in the beginning road segment as the second transition road segment.

In an embodiment, the road segment merging sub-module 1502*c* is further configured to:

merge, for the first road segment and the second road segment in a plurality of road segments of the first road adjacent to each other, the first road segment and the second road segment to obtain a merged road segment in response to that a sequence of road geometry line points composed of location points corresponding to the first road segment and location points corresponding to the second road segment changes linearly; or merge, for the first road segment and the second road segment in the plurality of road segments of the first road adjacent to each other, the first road segment and the second road segment to obtain a merged road segment, in response to that an angle between a direction of travel corresponding to the first road segment and a direction of travel corresponding to the second road segment is less than a third threshold.

Based on the above, the technical solution provided by the embodiment of the present disclosure segments the road by segmenting the road based on the sequence of road geometry line points to obtain a plurality of road segments corresponding to the road, and each road segment is drawn as a plane. In response to that the road element spans two road segments that do not belong to the same plane, the road element is segmented (that is broken) based on the joint point on the boundary line, so that the segmented road elements are labeled on different road segments (that is, different planes), thereby solving the problem that a road element does not fit a road and improving labeling reasonability of road elements.

In addition, in response to that the road element spans two road segments that do not belong to the same plane, a road element is not overlaid by the road element through labeling the road element in sections on the road surface of the road segment based on the joint point, which further improves labeling reasonability of road elements.

It is to be understood that when the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus in the above embodiment belongs to the same idea as the method. For an example implementation thereof, refer to the method embodiment, and the details are not described herein. The module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules.

Figure 17:
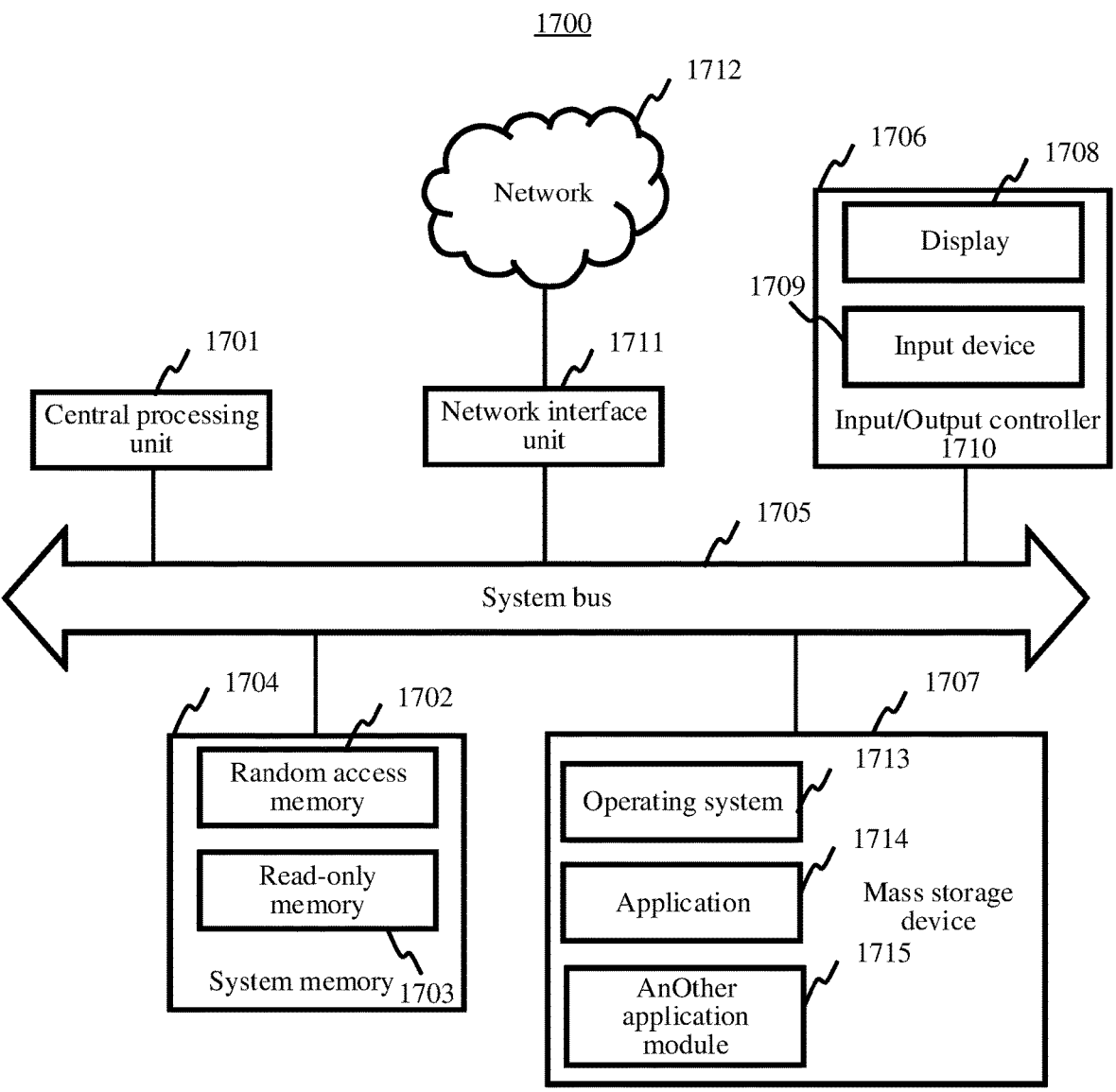
FIG. 17 is a block diagram of a computer device according to an embodiment of the present disclosure.

FIG. 17 is a structural block diagram of a computer device according to an embodiment of the present disclosure. The computer device may be configured to implement the method for labeling a road element provided in the above embodiments. Details may be as follows.

The computer device 1700 includes a central processing unit (CPU), a graphics processing unit (GPU), and a field programmable gate array (FPGA) 1701, a system memory 1704 including a random access memory (RAM) 1702 and a read-only memory (ROM) 1703, and a system bus 1705 connected to the system memory 1704 and the CPU 1701. The computer device 1700 further includes a basic input/output system (I/O system) 1706 assisting information transmission between devices in the server, and a mass storage device 1707 configured to store an operating system 1713, an application program 1714, and other program modules 1715.

The basic I/O system 1706 includes a display 1708 configured to display information and an input device 1709, such as a mouse or a keyboard, configured to input information for a user. The display 1708 and the input device 1709 are both connected to the CPU 1701 through an I/O controller 1710 connected to the system bus 1705. The basic I/O system 1706 may further include the I/O controller 1710 for receiving and processing input from a plurality of other devices such as a keyboard, a mouse, or an electronic stylus. Similarly, the input/output controller 1710 further provides an output to a display screen, a printer, or another type of output device.

The mass storage device 1707 is connected to the CPU 1701 by using a mass storage controller (not shown) connected to the system bus 1705. The mass storage device 1707 and an associated computer-readable medium thereof provide non-volatile storage for the computer device 1700. In other words, the mass storage device 1707 may include a computer-readable medium (not shown) such as a hard disk or a compact disc read-only memory (CD-ROM) drive.

Generally, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable read-only memory (EPROM), an electrically erasable programmable ROM (EEPROM), a flash memory or other solid-state storage technologies, a CD-ROM, a digital versatile disc (DVD) or other optical memories, a tape cartridge, a magnetic cassette, a magnetic disk memory, or other magnetic storage devices. Certainly, persons skilled in art can know that the computer storage medium is not limited to the foregoing several types. The system memory 1704 and the mass storage device 1707 may be collectively referred to as a memory.

According to embodiments of the present disclosure, the computer device 1700 may be further connected to a remote computer on a network for running through a network such as the Internet. In other words, the computer device 1700 may be connected to a network 1712 through a network interface unit 1711 connected to the system bus 1705, or may be connected to other types of networks or remote computer systems (not shown) through the network interface unit 1711.

The memory further includes at least at least one instruction, at least one program, a code set, or an instruction set. The at least one instruction, the at least one program, the code set, or the instruction set are stored in memory, and configured to be executed by one or more processors, to implement the method for labeling a road element.

In an exemplary embodiment, a computer-readable storage medium is further provided. The storage medium storing at least one instruction, at least one program, a code set, or an instruction set, the at least one instruction, the at least one program, the code set, or the instruction set being executed by the processor to implement the method for labeling a road element.

In some embodiments, the computer-readable storage medium includes a read-only memory (ROM), a random-access memory (RAM), a solid state drive (SSD), an optical disc, or the like. The RAM may include a resistance random access memory (ReRAM) and a dynamic random access memory (DRAM).

In an exemplary embodiment, a computer program product is further provided. The computer program product includes computer instructions, and the computer instructions are stored in the computer-readable storage medium. The processor of the computer device reads the computer instructions from the computer-readable storage medium. The processor executes the computer instructions, so that the computer device executes above method for labeling a road element.

It is to be understood that the information (including but not limited to device information of an object and personal information of an object), data (including but not limited to data used for analysis, stored data, and displayed data), and signals in the present disclosure are all authorized by the object or fully authorized by all parties, and collection, use, and processing of relevant data need to comply with relevant laws, regulations, and standards of relevant countries and regions. For example, the road geometry, the road element, the road distribution, and the like of the roads referred to in the present disclosure are obtained and used with full authorization.

The concepts "at least one instruction, at least one program, a code set, or an instruction set" and "computer instructions" herein may also be referred to as "computer program", and these concepts express the same meaning.

It is to be understood that the term "a plurality of" in the description means two or more. "And/or" describes an association relationship between associated objects and indicates that three relationships may exist. For example, A and/or B may represent the following three cases: only A exists, both A and B exist, and only B exists. The character "/" in this specification generally indicates an "or" relationship between the associated objects. In addition, the step numbers described in this specification merely exemplarily show an exemplary execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for labeling a road element, the method being performed by a computer device, and comprising:

obtaining a sequence of road geometry line points of a first road in a three-dimensional map, the sequence of road geometry line points comprising a plurality of location points for drawing an outline of a road geometry of the first road;

segmenting the first road based on the sequence of road geometry line points, to obtain a plurality of road segments of the first road, a road surface of a road segment being drawn as a plane, comprising:

obtaining, for a first location point, a second location point, and a third location point that are sequentially arranged in the sequence of road geometry line points, a turning point detection result corresponding to the second location point, and a first boundary point and a second boundary point corresponding to the second location point, the first boundary point and the second boundary point being two intersection points between a first straight line and a road boundary of the first road, the first straight line being a line passing through the second location point and perpendicular to a connecting line between the first location point and the second location point, and the turning point detection result indicating whether the second location point is a turning point; and determining one or more road segments corresponding to the second location point in the first road based on the turning point detection result, comprising:

in response to the second location point being a turning point, determining a curved road segment corresponding to the second location point, and determining a remaining plane obtained after the curved road segment is removed from a target plane as a straight road segment corresponding to the second location point; and determining, in response to that a target road element spans across a boundary line of two adjacent road segments in the first road, a joint point located on the boundary line, the joint point being configured as a label to divide the target road element as two sections that are respectively placed on the road surfaces of the two adjacent road segments.

2. The method according to claim 1, wherein the determining a joint point located on the boundary line comprises:

determining a target plane perpendicular to the target road element and the two adjacent road segments; and determining an intersection point between the target plane and the boundary line as the joint point.

3. The method according to claim 1, wherein the determining one or more road segments corresponding to the second location point in the first road based on the turning point detection result comprises:

determining a third boundary point based on the first boundary point and the second boundary point in response to that the second location point is the turning point, the third boundary point being an intersection point between a second straight line and the road boundary of the first road, the second straight line being a line passing through the first boundary point or the second boundary point and perpendicular to a connecting line between the second location point and the third location point;

determining a plane defined by the first boundary point, the second boundary point, and the third boundary point as the curved road segment corresponding to the second location point;

obtaining a fourth boundary point and a fifth boundary point corresponding to the third location point in response to that the third location point is not located in the curved road segment, the fourth boundary point and the fifth boundary point being two intersection points between a third straight line and the road boundary of the first road, the third straight line being a line passing through the third location point and perpendicular to the connecting line between the second location point and the third location point; and determining the remaining plane obtained after the curved road segment is removed from the target plane defined by the first boundary point, the second boundary point, the fourth boundary point, and the fifth boundary point as the straight road segment corresponding to the second location point.

4. The method according to claim 3, wherein the determining a third boundary point based on the first boundary point and the second boundary point comprises:

determining a target boundary point from the first boundary point and the second boundary point, wherein a ray from the second location point toward the third location point intersects a fourth straight line, the fourth straight line being a line passing through the target boundary point and perpendicular to the connecting line between the second location point and the third location point; and determining the other intersection point of the two intersection points between the fourth straight line and the road boundary of the first road other than the target boundary point as the third boundary point, an elevation of the third boundary point being set to be the same as an elevation of the second location point.

5. The method according to claim 3, further comprising:

updating the third location point to an intersection point between a fifth straight line and a line connecting the third location point and a fourth location point in response to that the third location point is located in the curved road segment, the fifth straight line being a line passing through the target boundary point corresponding to the third boundary point and the third boundary point, the fourth location point being another location point in the sequence of road geometry line points adjacent to the third location point other than the second location point.

6. The method according to claim 3, further comprising:

merging the curved road segment and the straight road segment to obtain a road segment corresponding to the second location point in response to that a difference between an elevation of the third boundary point and an elevation of the third location point is less than or equal to a first threshold, an elevation of each road surface point in the curved road segment being adjusted based on coordinate information of the first boundary point, coordinate information of the second boundary point, coordinate information of the fourth boundary point, and coordinate information of the fifth boundary point.

7. The method according to claim 1, further comprising:

obtaining a fourth boundary point and a fifth boundary point corresponding to the third location point in response to that the second location point is not the turning point, the fourth boundary point and the fifth boundary point being two intersection points between a third straight line and the road boundary of the first road, the third straight line being a line passing through the third location point and perpendicular to the connecting line between the second location point and the third location point; and determining a plane defined by the first boundary point, the second boundary point, the fourth boundary point, and the fifth boundary point as a road segment corresponding to the second location point.

8. The method according to claim 1, further comprising:

determining the second location point as the turning point in response to that a ray direction from the first location point toward the second location point is different from a ray direction from the second location point toward the third location point; and determining the second location point as a non-turning point in response to that the ray direction from the first location point toward the second location point is the same as the ray direction from the second location point toward the third location point.

9. The method according to claim 1, wherein the obtaining a sequence of road geometry line points of a first road in a three-dimensional map comprises:

extracting location points from a road geometry line of the first road, to obtain a sequence of initial road geometry line points corresponding to the first road, the sequence of initial road geometry line points comprising key location points indicating a road geometry of the first road;

rarefying the location points in the sequence of initial road geometry line points other than the key location points, to obtain a sequence of rarefied road geometry line points; and densifying the location points of the sequence of rarefied road geometry line points based on a second threshold, to obtain the sequence of road geometry line points, a distance between two adjacent location points in the sequence of road geometry line points being less than or equal to the second threshold.

10. The method according to claim 9, wherein the densifying the location points of the sequence of rarefied road geometry line points based on a second threshold, to obtain the sequence of road geometry line points comprises:

inserting, for two adjacent location points in the sequence of rarefied road geometry line points, a location point between the two adjacent location points to obtain a sequence of transitional road geometry line points in response to that a distance between the two adjacent location points is greater than the second threshold; and stopping densifying the location points of the sequence of rarefied road geometry line points based on the second threshold to obtain the sequence of road geometry line points in response to that a distance between two adjacent location points in the sequence of transitional road geometry line points is less than or equal to the second threshold.

11. The method according to claim 9, wherein the road geometry line of the first road is a center line of the first road.

12. The method according to claim 1, further comprising:

defining, for the first road and a second road connected to the first road, a first transition road segment from a last road segment of the first road, and a second transition road segment from a beginning road segment of the second road, the last road segment being a road segment in the first road adjacent to the second road, the beginning road segment being a road segment in the second road adjacent to the first road, and the first transition road segment and the second transition road segment being connected based on a first intersection line between the first road and the second road; and merging the first transition road segment and the second transition road segment, to obtain a transition road segment between the first road and the second road.

13. The method according to claim 12, wherein the defining a first transition road segment from a last road segment of the first road and a second transition road segment from a beginning road segment of the second road comprises:

obtaining a first intersection point and a second intersection point corresponding to the first intersection line, the first intersection point and the second intersection point being two intersection points between a road boundary of the first road and a road boundary of the second road;

drawing a vertical line perpendicular to a road geometry line of the last road segment and passing through the first intersection point and the second intersection point, and drawing a vertical line perpendicular to a road geometry line of the beginning road segment and passing through the first intersection point and the second intersection point; and determining, in response to that a foot of a perpendicular of the first intersection point on the road geometry line corresponding to the last road segment is located in the last road segment, a plane defined by a vertical line between the first intersection point and the road geometry line of the last road segment and the first intersection line in the last road segment as the first transition road segment, and determining a plane defined by a vertical line between the second intersection point and the road geometry line of the beginning road segment and the first intersection line in the beginning road segment as the second transition road segment.

14. The method according to claim 1, further comprising:

merging, for the first road segment and the second road segment in a plurality of road segments of the first road adjacent to each other, the first road segment and the second road segment to obtain a merged road segment in response to that a sequence of road geometry line points composed of location points corresponding to the first road segment and location points corresponding to the second road segment changes linearly;

or merging, for the first road segment and the second road segment in the plurality of road segments of the first road adjacent to each other, the first road segment and the second road segment to obtain a merged road segment, in response to that an angle between a direction of travel corresponding to the first road segment and a direction of travel corresponding to the second road segment is less than a third threshold.

15. The method according to claim 1, wherein the first boundary point, the second boundary point, and the second location point are located on a boundary of the curved road segment corresponding to the second location point; and the second location point and the third location point are located on a boundary of the target plane.

16. The method according to claim 15, wherein the second location point is not located on a boundary of the straight road segment corresponding to the second location point.

17. An apparatus for labeling a road element, comprising:

at least one processor and at least one memory, the at least one memory storing a computer program, the computer program being loaded and executed by the at least one processor to implement:

obtaining a sequence of road geometry line points of a first road in a three-dimensional map, the sequence of road geometry line points comprising a plurality of location points for drawing an outline of a road geometry of the first road;

segmenting the first road based on the sequence of road geometry line points, to obtain a plurality of road segments of the first road, a road surface of a road segment being drawn as a plane, comprising:

obtaining, for a first location point, a second location point, and a third location point that are sequentially arranged in the sequence of road geometry line points, a turning point detection result corresponding to the second location point, and a first boundary point and a second boundary point corresponding to the second location point, the first boundary point and the second boundary point being two intersection points between a first straight line and a road boundary of the first road, the first straight line being a line passing through the second location point and perpendicular to a connecting line between the first location point and the second location point, and the turning point detection result indicating whether the second location point is a turning point; and determining one or more road segments corresponding to the second location point in the first road based on the turning point detection result, comprising:

in response to the second location point being a turning point, determining a curved road segment corresponding to the second location point, and determining a remaining plane obtained after the curved road segment is removed from a target plane as a straight road segment corresponding to the second location point; and determining, in response to that a target road element spans across a boundary line of two adjacent road segments in the first road, a joint point located on the boundary line, the joint point being configured as a label to divide the target road element as two sections that are respectively placed on the road surfaces of the two adjacent road segments.

18. The apparatus according to claim 17, wherein the determining a joint point located on the boundary line comprises:

determining a target plane perpendicular to the target road element and the two adjacent road segments; and determining an intersection point between the target plane and the boundary line as the joint point.

19. The apparatus according to claim 17, wherein the determining one or more road segments corresponding to the second location point in the first road based on the turning point detection result comprises:

determining a third boundary point based on the first boundary point and the second boundary point in response to that the second location point is the turning point, the third boundary point being an intersection point between a second straight line and the road boundary of the first road, the second straight line being a line passing through the first boundary point or the second boundary point and perpendicular to a connecting line between the second location point and the third location point;

determining a plane defined by the first boundary point, the second boundary point, and the third boundary point as the curved road segment corresponding to the second location point;

obtaining a fourth boundary point and a fifth boundary point corresponding to the third location point in response to that the third location point is not located in the curved road segment, the fourth boundary point and the fifth boundary point being two intersection points between a third straight line and the road boundary of the first road, the third straight line being a line passing through the third location point and perpendicular to the connecting line between the second location point and the third location point; and determining the remaining plane obtained after the curved road segment is removed from the target plane defined by the first boundary point, the second boundary point, the fourth boundary point, and the fifth boundary point as the straight road segment corresponding to the second location point.

20. A non-transitory computer-readable storage medium, storing a computer program, the computer program being loaded and executed by at least one processor to implement:

obtaining a sequence of road geometry line points of a first road in a three-dimensional map, the sequence of road geometry line points comprising a plurality of location points for drawing an outline of a road geometry of the first road;

segmenting the first road based on the sequence of road geometry line points, to obtain a plurality of road segments of the first road, a road surface of a road segment being drawn as a plane, comprising:

obtaining, for a first location point, a second location point, and a third location point that are sequentially arranged in the sequence of road geometry line points, a turning point detection result corresponding to the second location point, and a first boundary point and a second boundary point corresponding to the second location point, the first boundary point and the second boundary point being two intersection points between a first straight line and a road boundary of the first road, the first straight line being a line passing through the second location point and perpendicular to a connecting line between the first location point and the second location point, and the turning point detection result indicating whether the second location point is a turning point; and determining one or more road segments corresponding to the second location point in the first road based on the turning point detection result, comprising:

in response to the second location point being a turning point, determining a curved road segment corresponding to the second location point, and determining a remaining plane obtained after the curved road segment is removed from a target plane as a straight road segment corresponding to the second location point; and determining, in response to that a target road element spans across a boundary line of two adjacent road segments in the first road, a joint point located on the boundary line, the joint point being configured as a label to divide the target road element as two sections that are respectively placed on the road surfaces of the two adjacent road segments.

* * * * *